United States Patent [19]

Fleshman

[11] 3,941,091

[45] Mar. 2, 1976

[54] EGG LAYER SYSTEM

[76] Inventor: Roger L. Fleshman, 204 Cypress Circle, Broomfield, Colo. 80020

[22] Filed: Mar. 7, 1974

[21] Appl. No.: 448,840

Related U.S. Application Data

[63] Continuation-in-part of Ser. No. 396,292, Sept. 11, 1973, Pat. No. 3,867,903.

[52] U.S. Cl. .................. 119/18; 119/22; 119/48
[51] Int. Cl.² ...................................... A01K 31/00
[58] Field of Search .................. 119/48, 21, 22, 18

[56] References Cited
UNITED STATES PATENTS

| | | | |
|---|---|---|---|
| 2,314,344 | 3/1943 | Cornell | 119/21 |
| 3,312,194 | 4/1967 | Ernst | 119/22 |

Primary Examiner—Hugh R. Chamblee
Attorney, Agent, or Firm—James E. Pittenger

[57] ABSTRACT

An egg layer system for the production of poultry eggs which includes a plurality of tiered, open mesh wire cages arranged back-to-back and mounted in a plurality of rows extending the length of an elongated, rectangular building enclosure. The cage rows are arranged so as to form equally spaced aisles between facing cages. At the base of the cage rows is a parallel track assembly provided to permit a servicing carriage to be moved along the individual aisles. An open, transverse aisle is provided at each end of the cage rows which include guide means for directing the service carriage from one aisle into the next aisle for forming a continuous, closed-circuit path for the movement of the carriages along each of the cage rows of the entire system. No feed or water troughs are provided in the cages with the feed and water provisions included in the service carriages. The service carriages thus provide the feeding and watering function along with egg collection, manure scraping and collection arranged to make one complete circuit every two hours. The carriages can be connected in tandem to form a single moving unit if desired. The tiered cage row units can be stacked, one on top of the other, in a double deck arrangement with the cage supporting columns providing the building structural support. Sloping outer sidewalls also provide building structural support and improve air ventilation through the entire cage system. A continuous baffle can be provided under the cage structure having adjustable openings below each cage aisle to permit natural ventilation of air from openings in the sloped sidewalls through the space provided below the baffle, with the air passing upwardly through the cage area and outwardly through louvers provided in the uppermost portion of the building roof. Cooling and heating of the air is controlled automatically by units provided below the baffle area. The collected poultry manure is reused for feeding to the poultry by leaching and protein amplification processes which recover the carbohydrates, protein and vitamin components which can be mixed with poultry feed either wet or dry. A feed system is provided on the feed carriage for dispensing the feed automatically to the birds. A novel arrangement is also provided on a utility carriage for loading and unloading the birds automatically into the poultry cages.

8 Claims, 31 Drawing Figures

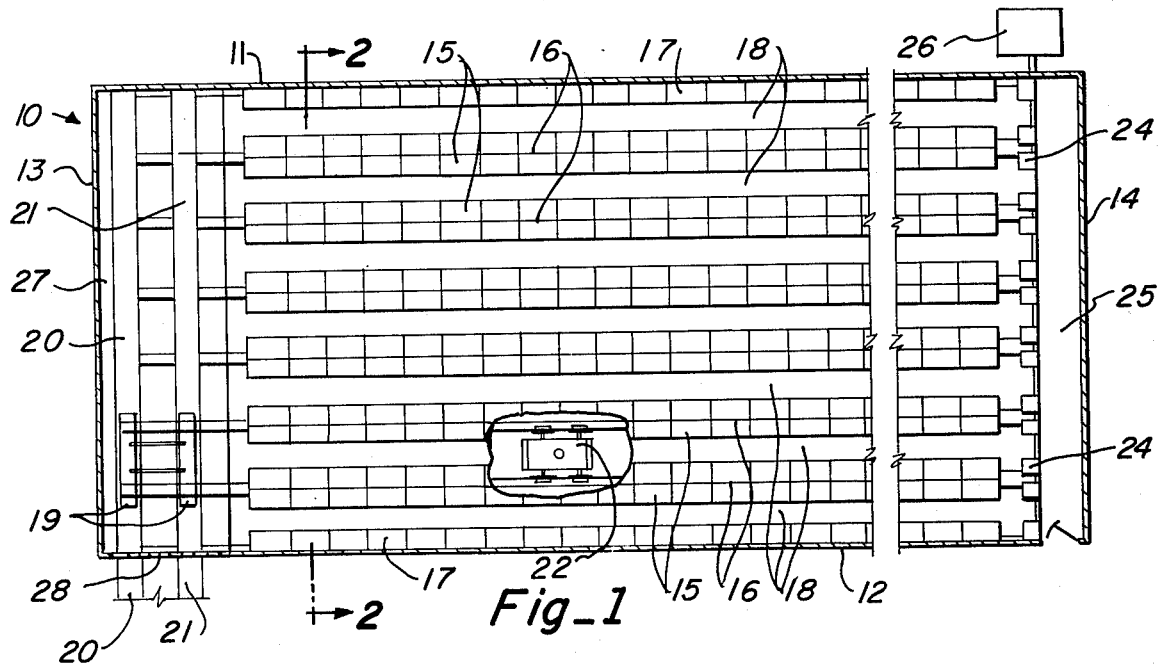
Fig_1
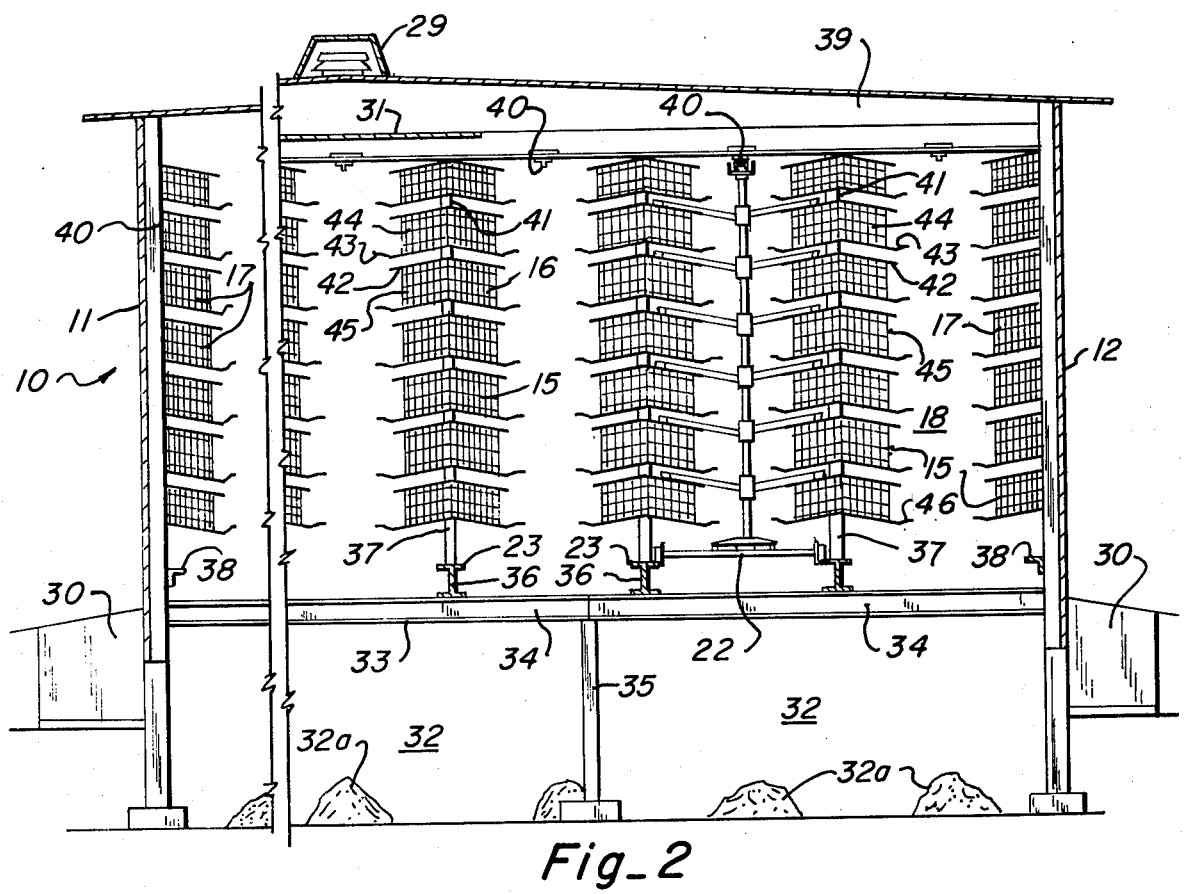
Fig_2

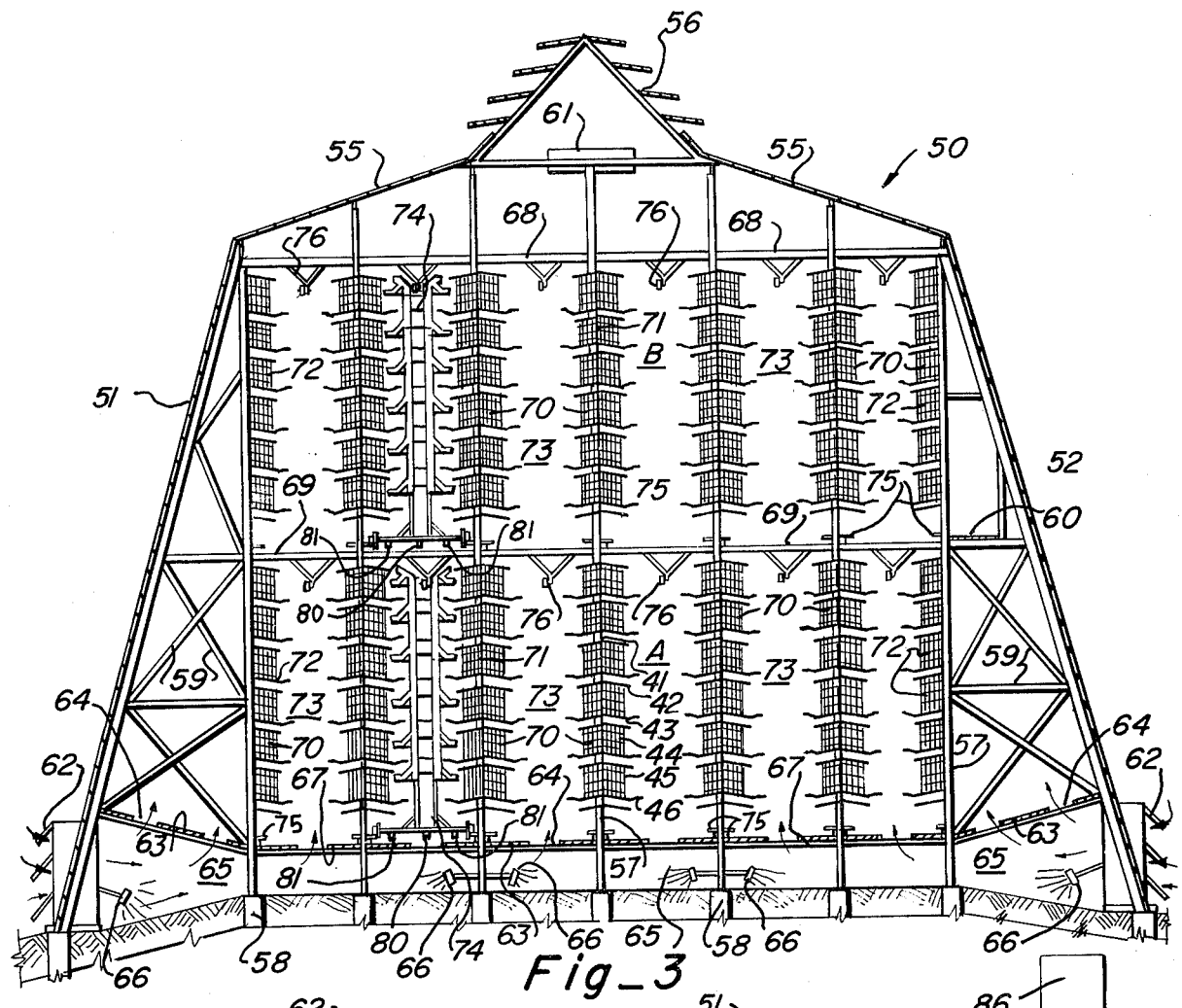
Fig_3
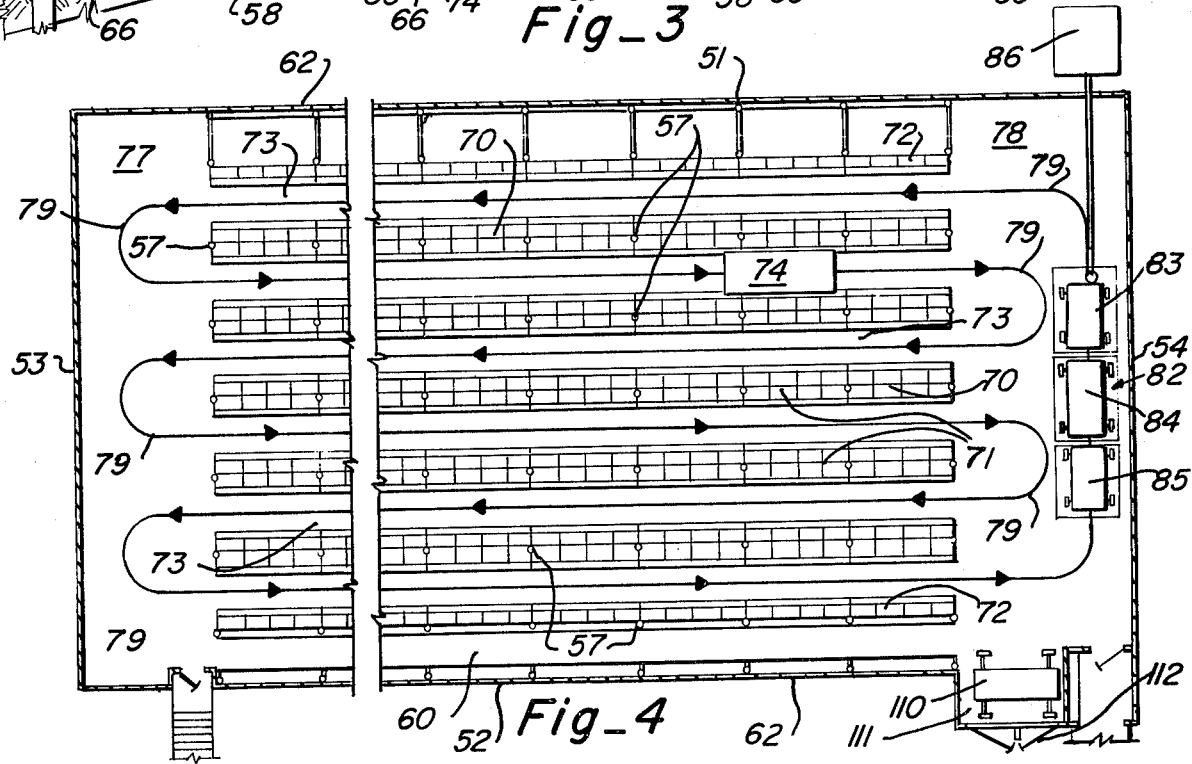
Fig_4

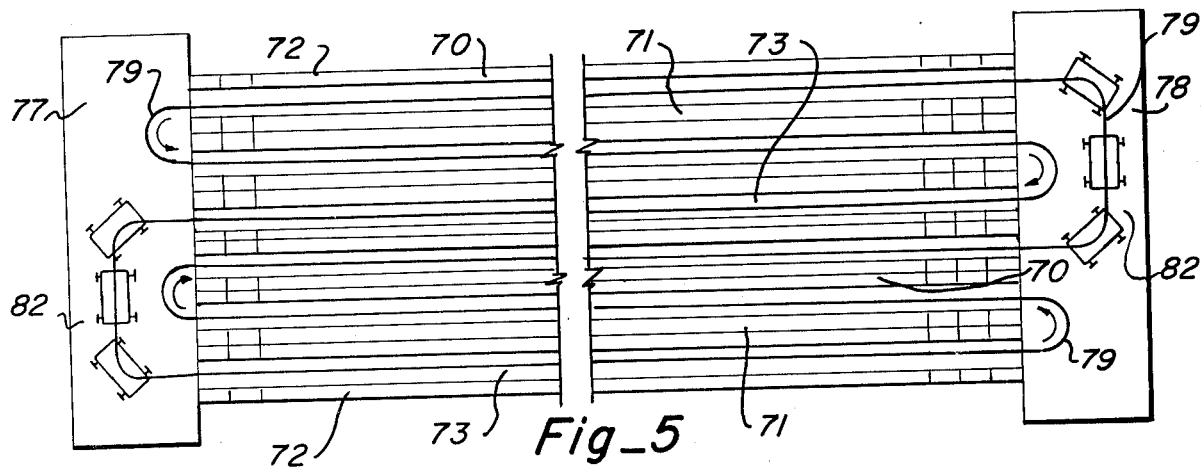
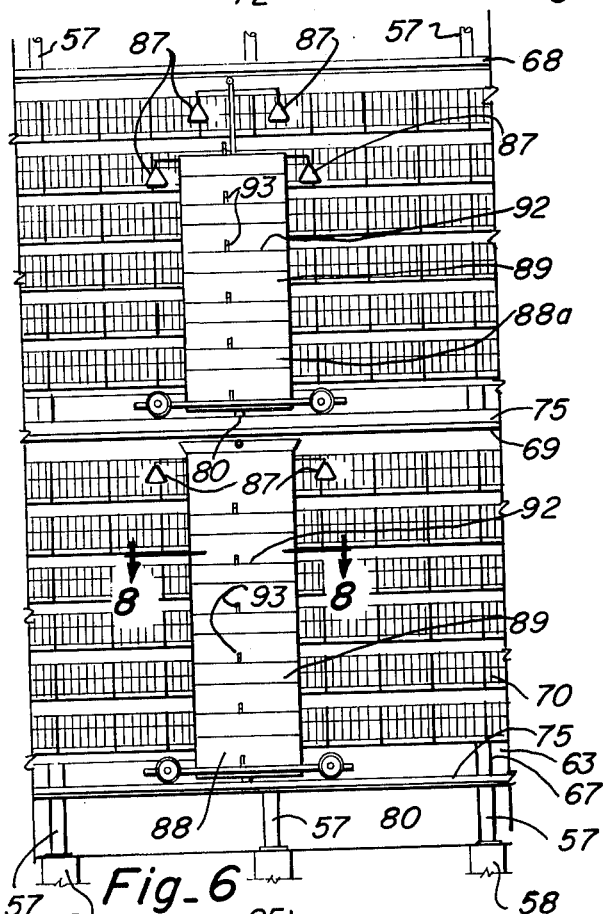
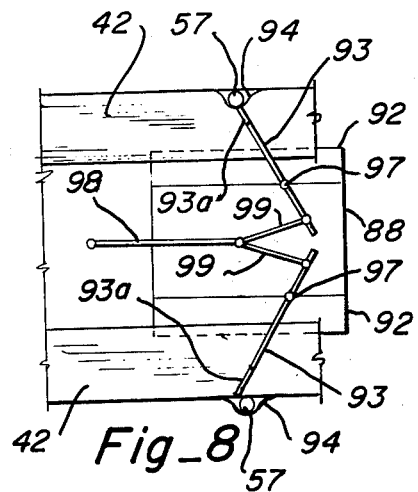
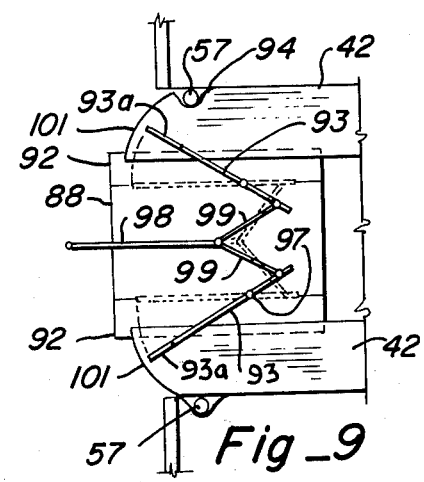
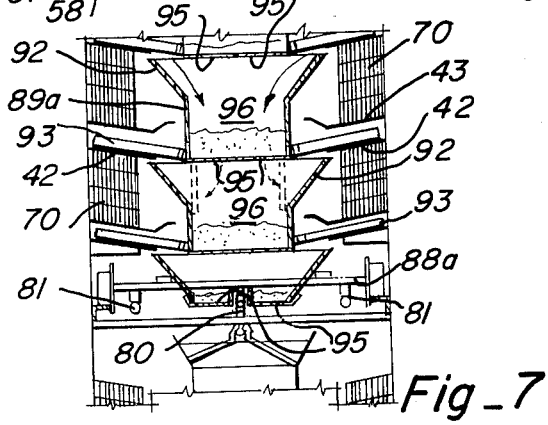
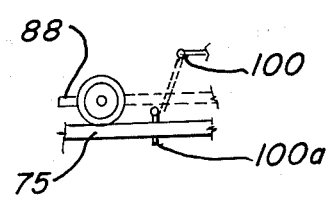

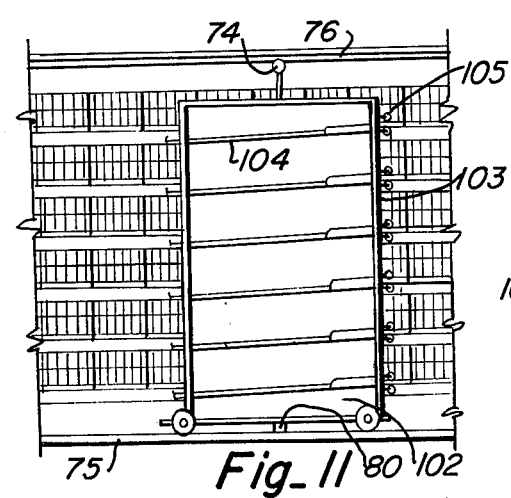
Fig_11
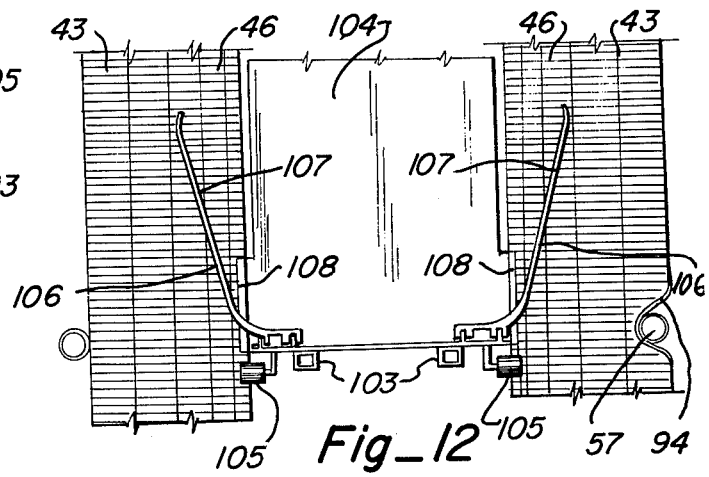
Fig_12
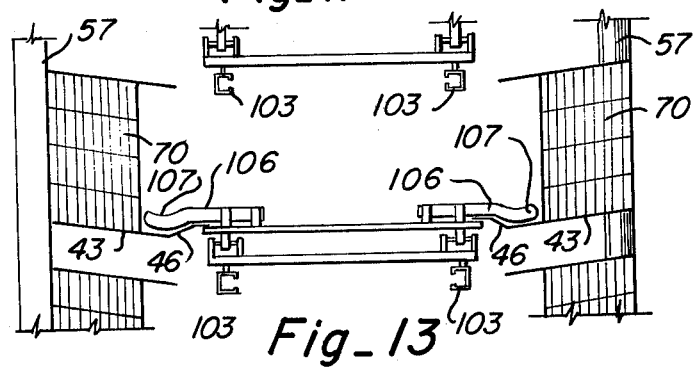
Fig_13 Fig_14
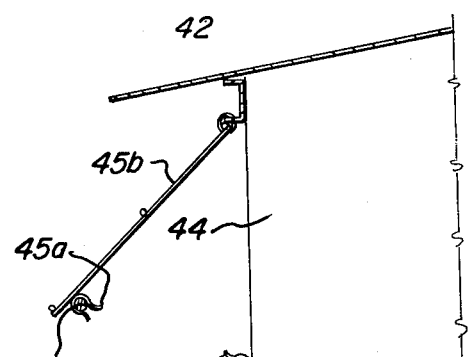
Fig_17
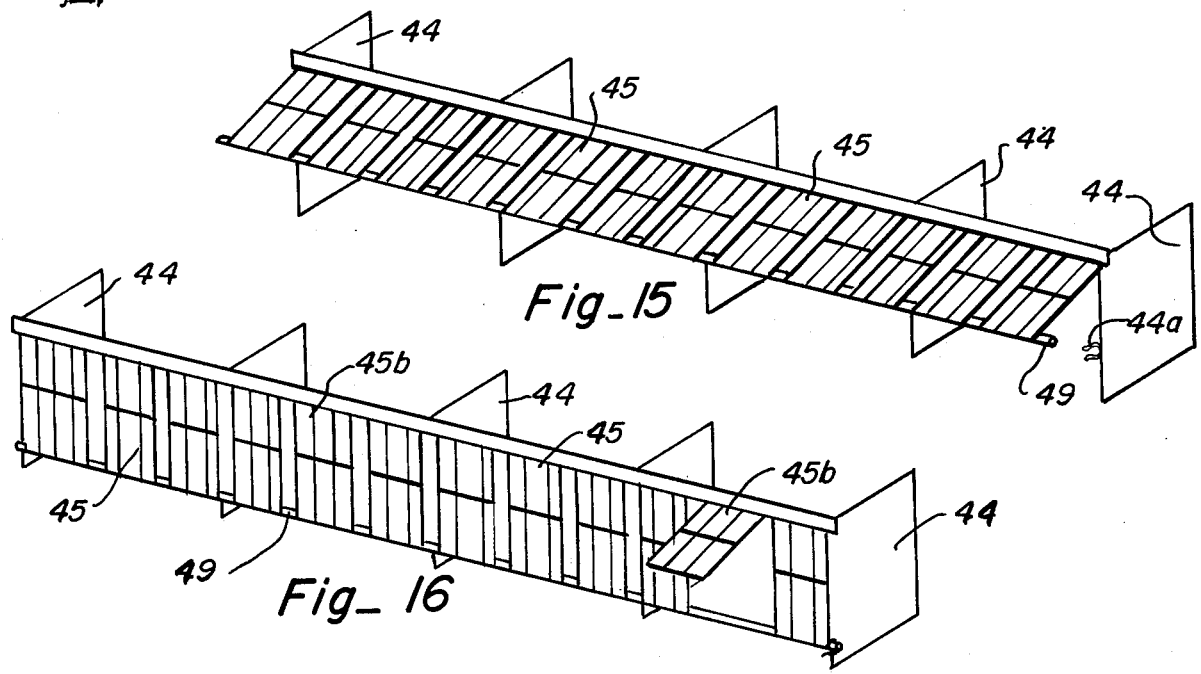
Fig_15
Fig_16

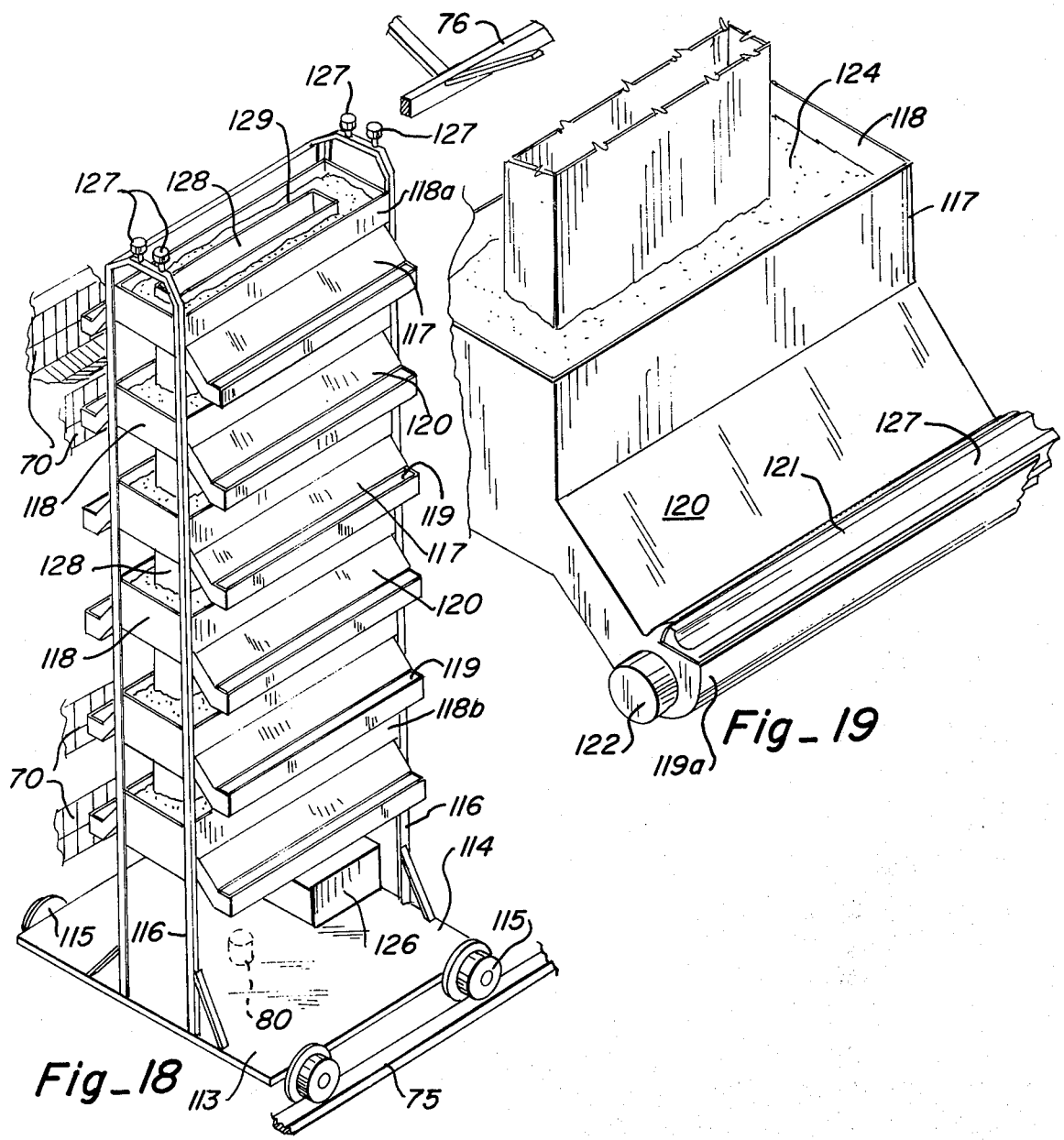
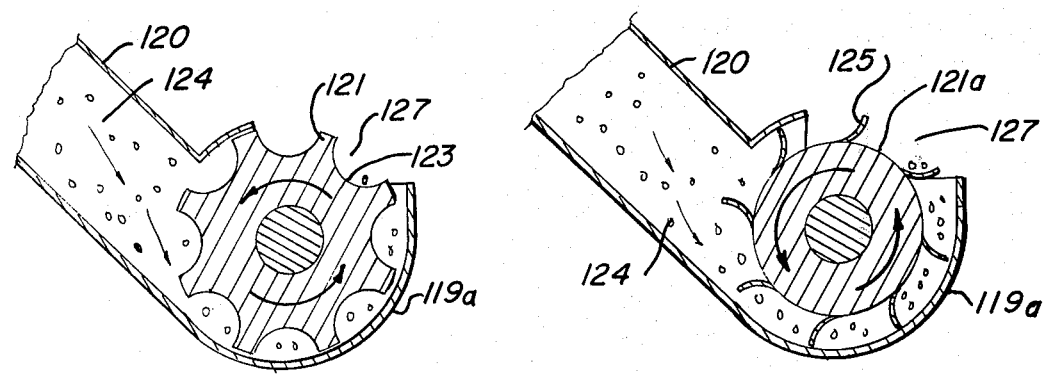
Fig_18  Fig_19  Fig_20  Fig_21

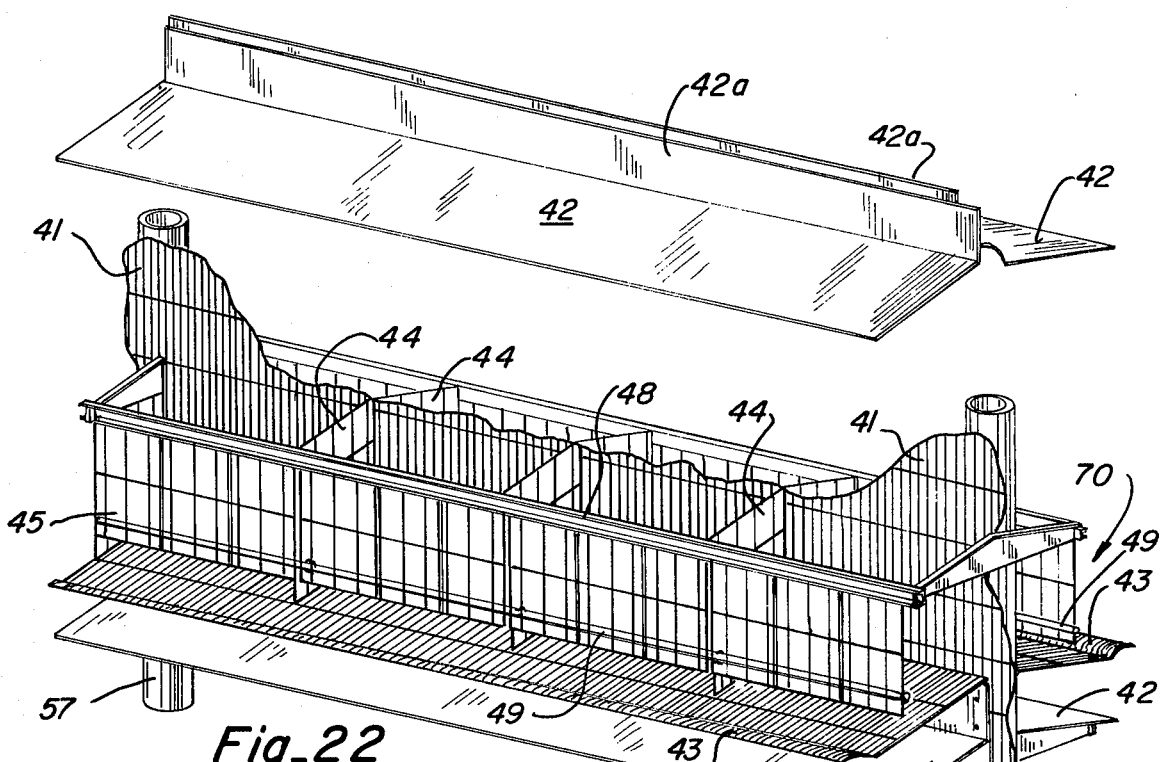
Fig_22
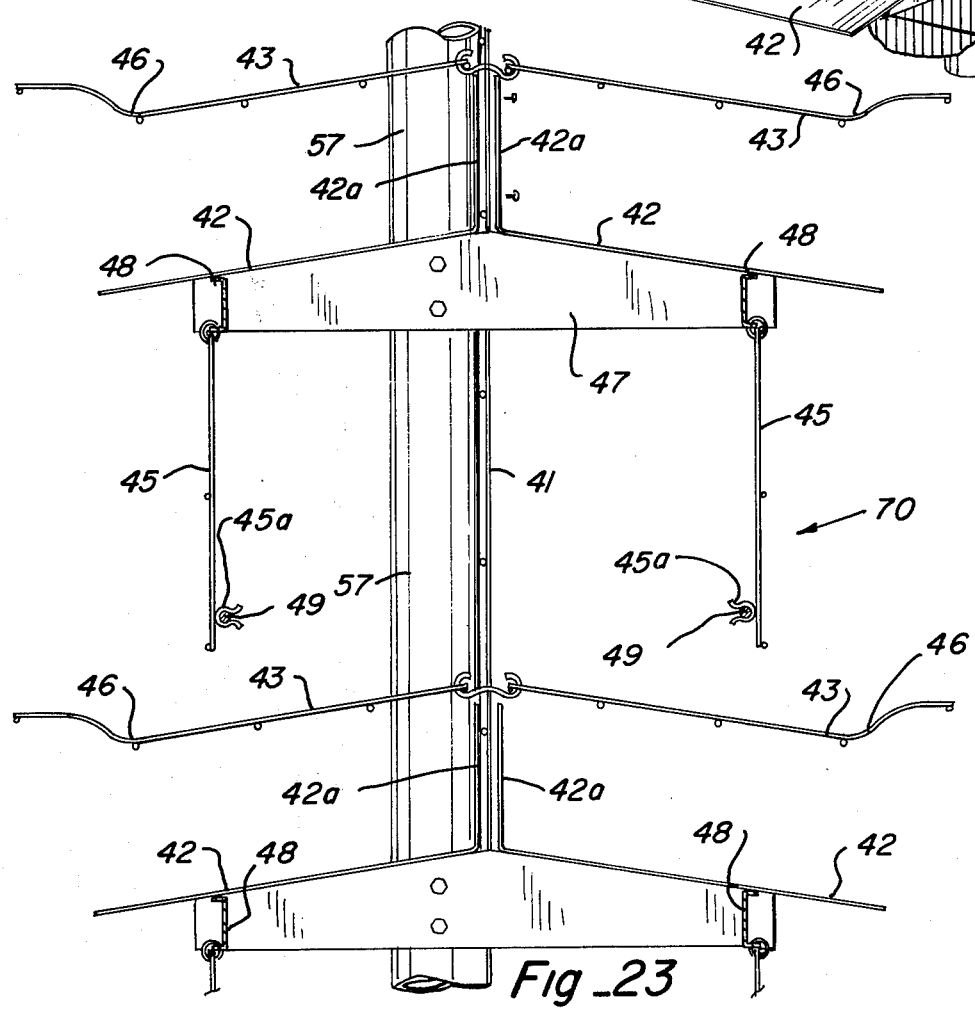
Fig_23

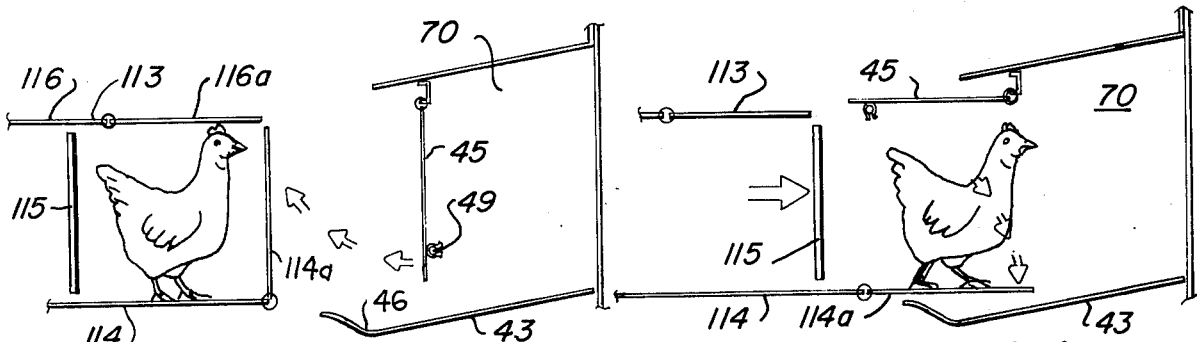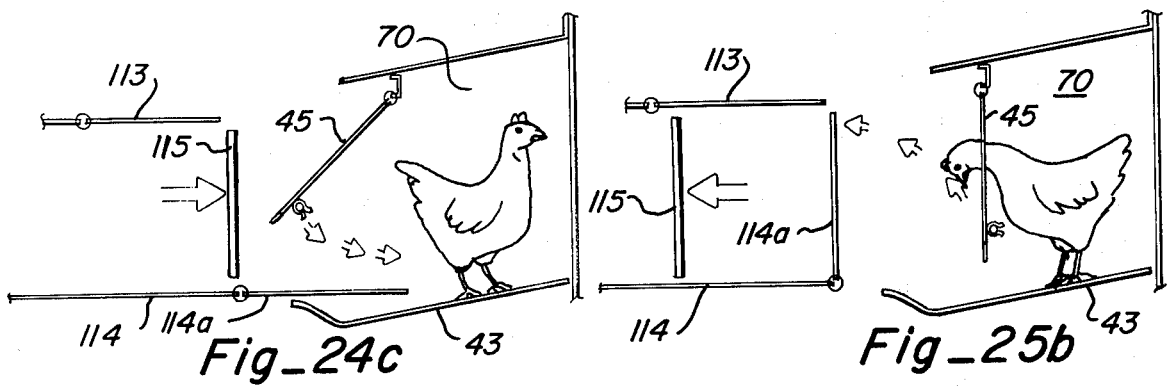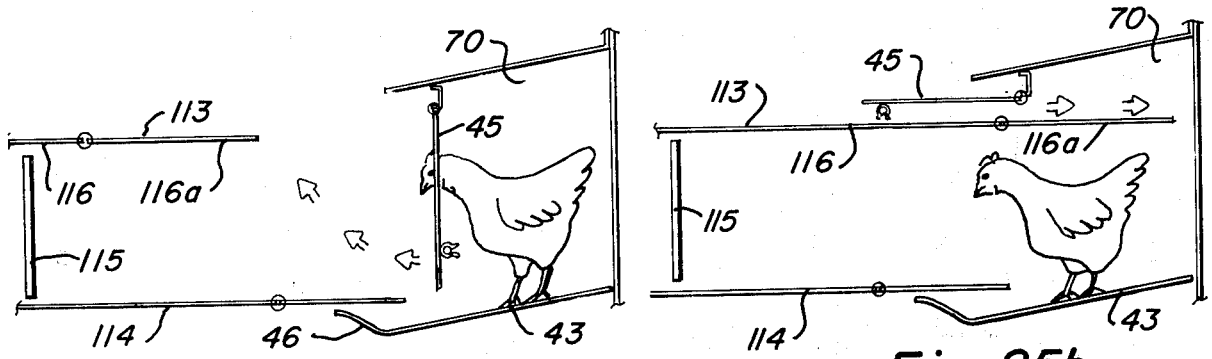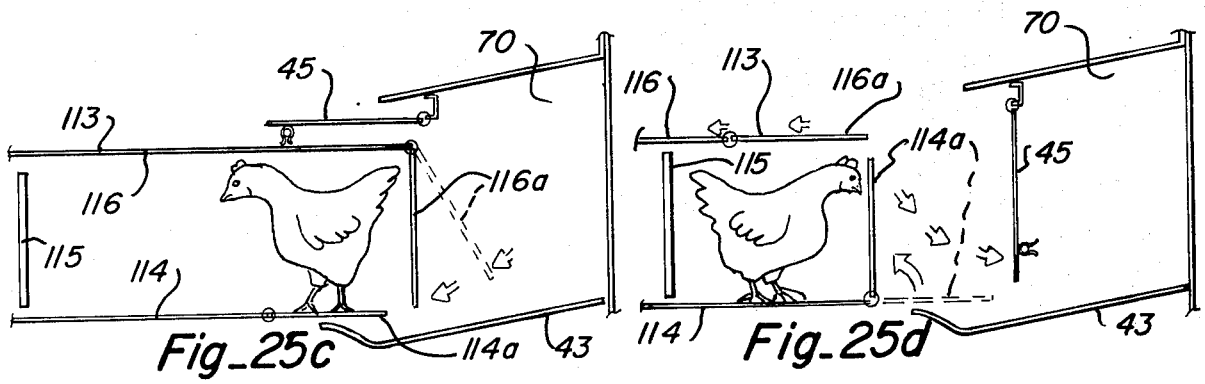

EGG LAYER SYSTEM

This application is a continuation-in-part of my co-pending application, Ser. No. 396,292, filed Sept. 11, 1973, now U.S. Pat. No. 3,867,903, for an improved egg layer system.

This invention is directed to an improved cage layer system having a novel cage construction and facilities for servicing the cages during operation. It is more specifically directed to a caged layer system wherein the cages are arranged in back-to-back fashion, facing aisles formed therebetween and providing carriage service facilities for the collection of eggs, scraping of manure, feeding and watering the birds and providing access to the individual cages. The cage construction provides complete, efficient use of the novel building arrangement.

In the past, it has been well known to provide egg layer systems which provide rows of cages usually built on the ground or elevated a few feet from the floor of the building. Aisles were provided between the cages so that an individual could walk between the cages manually collecting eggs or cleaning the cages as necessary. To increase the efficiency or utilization of the space within the building, it later developed that the cages could be stacked, one on top of the other, to increase the available cage space and number of birds accommodated. Next, it was found that the cages could be arranged in multiple tiers whereby the tiers of cages would be stacked in spaced relation above each other. In this arrangement, tiers of 2, 3 and 4 cages have been common.

With the advent of the tiered poultry cages, many problems were encountered which were not experienced prior to this time. One of these problems was the inability to manually collect the egg production that was increased by the multiple tier arrangement of the cages. In addition, the accessability of the cages was greatly diminished. Cleanliness of the cages became a major problem in that the droppings from the higher cages would fall upon the lower cages, greatly increasing sanitation problems with possible sickness and disease in the poultry flock necessitating the destruction of portions or the entire flock of birds. It is now well known in the prior art to provide continuous manure dropping board shields below each of the higher tiers of cages to maintain the cleanliness of the cages below. In addition, the collection of eggs has been mechanized to automate the handling of the eggs by such means as a conveyor belt to move the eggs from the individual cages to a processing area. It is common also to provide access from each cage to feed and water troughs and to provide complicated mechanisms for continuously replenishing the supply of feed and water in these troughs for continuous feeding of the birds.

To alleviate the problems associated with manure dropping boards and manure collection, various devices have been suggested in the prior art, such as a scraping bar pulled along the extent of the dropping boards by means of a cable or chain. Usually these devices are controlled by means of a timing device to automatically move the scrapers along the board at preset time intervals, which never take into account the actual condition or amount of manure present on the dropping boards prior to the initiation of the operation. In other devices, endless belt conveyors are provided below each tier or row of cages to collect the manure from the cages and move the manure to a cleaning area.

In another device in the prior art, as shown in U.S. Pat. 3,312,194, an individual double carriage arrangement is provided for each row of cages. The carriage is suspended on wheels positioned above the single row of tiered cages in a straddling fashion with legs extending down on both sides of the cage row. Inwardly extending arms having scrapers attached are provided for scraping the dropping boards. The carriages move along the entire row of cages by means of a cable which extends the length of the building. A hopper and feed chute is provided for filling the feed troughs extending along the front of the cages simultaneously with the cleaning operation. A single carriage is provided for each row of cages and no provision is made to shift the carriage from one row to another.

A circular cage layer system is also known in the prior art. The rows of double cages are arranged in a circular pattern and spaced radially from each other. The entire cage structure is arranged to rotate so that all of the cages pass by a radial aisle in which a carriage servicing arrangement for replenishing food and water in the individual cage troughs, egg collection and manure scraping is provided. The servicing carriage is arranged to be radially positioned so that each circle of cages may be rotated past the servicing carriage as desired. A major drawback in a system such as this is the extreme size, complexity and cost for the structure for rotating and guiding the cages so that they may be serviced as required.

Because of the problems and arrangements stated above as being present in the prior art, it is an object of the present invention to provide an egg layer system which will completely and efficiently utilize the entire volume available with an enclosing structure. This is to say that all of the available space within the building can be fully utilized to provide a maximum production of eggs for the original investment cost of the system.

Another object of the present invention is to provide an automated egg layer system wherein a minimum amount of manual labor is required for operation of the system. In this way, the cost of the egg production can be held to a very minimum.

A further object of the present invention is to provide an enclosed building structure wherein the cage support columns form an integral part of the overall building structure with ventilation compartments provided along the side portions of the structure and under the entire cage area for efficiently distributing conditioned air for improved cage ventilation.

A further object of the present invention is to provide an egg layer system wherein the cages are of shallow depth and are arranged back to back having a common curtain wall between the cages to maximize the use of the entire volume provided within the enclosing building and to minimize the cost of erecting the cages. The shallow depth of the cages reduces egg crackage and hen mortality.

A still further object of the present invention is to provide a caged layer system wherein carriages are provided to perform each of the necessary servicing functions for the entire system. The carriages are arranged to run on parallel rails provided at the base of the cage rows whereon the carriages can be moved down the aisles between the cages for servicing cages on both sides of the aisles simultaneously so as to feed and water the birds, collect eggs, scrape manure from the dropping boards and provide a work access platform for an attendant during the process of installing and removing birds from the cages.

It is a still further object of the present invention to provide a servicing carriage arrangement whereby the carriages can be turned at the end of each aisle so as to follow a closed circuit path so as to service each cage on a periodic cycling basis. The timing for the cycles is arranged to provide adequate feed and water to the birds to obtain optimum egg production.

Another object of the present invention is to provide a system whereby the poultry can be bathed in light periodically to simulate and accelerate the day-night cycle to increase the egg production process and kill disease bacteria by the use of germicidal light.

A further object of the present invention is to provide a carriage servicing arrangement whereby the birds can be loaded and unloaded automatically from holding cages.

It is a still further object of the present invention to provide a cage door latching device whereby the doors of the cages can be raised simultaneously in a group or individually as desired to accommodate the automatic loading and unloading of the cages.

A still further object of the present invention is to provide a feeding arrangement whereby the collected poultry manure can be processed to remove the harmful ingredients and increase its useful protein content so that it may be mixed with additional feed for reducing the overall feed costs and improve the efficiency of the feeding system.

It is another object of the present invention to provide a feeding system whereby the feed can be stored as a semi-fluid slurry and extruded continuously as needed for direct feeding to the birds.

The present invention is directed to an egg layer system wherein double cages are generally arranged in a back to back tier arragement extending in a plurality of longitudinal rows. The cage supporting columns provide the internal structure for the building with the height of the building increased to provide two complete egg layer systems within a single building providing a double deck arrangement. The cage rows and aisles are arranged one above the other to also facilitate the manure collection system.

The side walls of the building structure are arranged to slant outwardly so as to provide an air space between the outermost rows of cages and the building to provide a more constant temperature in these cages and also to provide additional space in the building at ground level for the installation of ventilation fans and air temperature conditioning devices. The earth below the cage ares is left exposed or covered with plastic sheet material with a ocntinuous baffle extending under the cage area providing a ventilation space or duct below the cages. Controllable openings are provided below each of the aisles for controlling the flow of conditioned air rising upwardly through the aisles and exhausting through ventilation louvers provided at the ridge of the building roof. The entire building can be positioned to take advantage of the prevailing winds so that the ventilation louvers and roof surface provide an airfoil effect to maximize the natural ventilation. Water spray nozzles can be provided in the lower ventilation duct to provide a cheap and simple evaporation cooling system for the entire building. A porous rock, such as crushed lava, or fiber mats, can be positioned in the duct to hold and distribute the water from the spray nozzles.

The individual cages have a common open mesh curtain wall forming the rear surface in the back to back arrangement. The depth of the individual cages which, for the purpose of this specification, is defined as the distance between the rear cage wall and the doors at the front of the cage, is extremely narrow. A depth of approximately 10 inches is contemplated to prevent canibalizing or damage to the eggs and to position the birds adjacent to the doors to permit access to the feeding carriage and prevent the birds from standing two deep in the cage.

The floor of the cage is tilted slightly downward toward the front with the doors spaced a sufficient distance above the floor to permit the layed eggs to roll outward from the cage. The outer edge of the floors is bent upwardly and flared outwardly to provide a collection trough for holding the eggs and facilitate the collection process. No feed troughs or watering troughs are provided in the cages of the present invention, with the feeding and watering provided on a cyclic basis by the servicing carriages. A feeding cycle of every 2 hours, with an exposure of the feed to each bird for a duration of approximately two and one-half minutes, is believed to be satisfactory. The exposure to water can be somewhat longer, if desired, with watering cups provided on several carriages. On this basis, a series of carriages connected in tandem would be arranged to move at approximately 5 or 6 feet per minute along each of the cage aisles. Each cycle would include a holding time period of 5 or 10 minutes for the refurbishing and resupply of the servicing carriages between each cycle. In the present invention, the lead carriage can be provided with an electric power drive motor with the electrical power fed to the carriage by means of one or more electrified bus rails either provided in conjunction with the support guide rails or provided at the top of the carriage center guide rail.

This cycling carriage arrangement also can provide a controlled day-night cycle which will increase the overall egg production. With the interior of the building held in relative darkness, daylight type lights can be mounted on the carriages whereby the poultry is exposed to a period of light during the feeding cycle with the area returned to darkness between the cycles. In this way, the feeding, roosting and laying cycles of the birds can be controlled to increase the egg production process. In addition, germicidal lights, such as ultraviolet, can be mounted on the carriages to bathe the poultry and cage area as it passes to kill any harmful bacteria which might be present.

The egg collecting carriages are similar to the previously described carriages in my copending application with the exception that each of the egg storage trays provided for each tier of cages includes a curved and outwardly angled arm riding over the outer edge of the cage floors to guide and move the eggs out of the floor trough and onto the egg collection tray. The egg collection arm is adapted to be raised when the individual tray has received its maximum quota of eggs to leave the remaining eggs for a later collection. The outer edge of the cage floors is led between a pair of rollers rotatably mounted at the rear of each side of the trays to elevationally position the floor trough with respect to the egg collection arm.

The manure scraping and collection carriage includes a vertical chase extending the height of the entire tiers of cages provided in each system. The pair of scraping arms which are individually provided for each tier of cages are arranged to include a mechanism for extending and retracting the arms as the carriage enters and leaves a cage aisle. The arms, when extended, are angled forwardly so as to scrape the individual dropping boards with the ends of the arms arranged to telescope to ride smoothly around the cage supporting columns and edge of the boards. An auxiliary drive motor can be provided on the manure scraping carriage to provide additional power necessary for the scraping operation.

The manure scraping and collection carriage includes an outwardly flared duct on each side of the carriage aligned with each tier of cages and the pair of scraping arms provided for each tier. The chase is divided into compartments arranged at each tier level with the floor of the compartment provided as a trap door whereby the manure scraped into each compartment is stored until the carriages arrive at the replenishing and servicing area. At this time, the doors of each of the compartments are opened simultaneously to drop the manure in the chase into a storage hopper provided below the floor area. In the double deck arrangement, the manure from the top manure carriage drops directly through the chase of the bottom carriage into the collection hopper.

A separate utility carriage which is capable of being independently moved to and along any of the cage aisles includes an elevatable platform to provide manual access to the individual cages and also can include a plurality of holding cages and mechanism for automatically loading and unloading poultry from the individual production cages. The utility carriage includes a pair of steerable wheels for driving the carriage along the transverse service areas and to align the carriage with the cage aisles.

The present invention also provides a unique arrangement for reutilizing the manure collected in the sysem. As is known, the manure includes a substantial amount of unused proteins and carbohydrates which are passed through and unused in the poultry digestive track. The collected manure can be suitably processed to remove any harmful and undesirable constituents. After this revitalization process, the manure residue is mixed in a predetermined ratio with new poultry feed to be stored for later use. In one method, only a portion of the water present is removed from the manure and the feed and manure mixture is stored as a semi-liquid slurry for direct feeding to the poultry.

The feed carriage of the present invention is designed to be utilized with dry feed or can be used with the semi-dry or slurry type feed when the reprocessed manure is mixed with new feed. It is to be understood that the feed carriage embodiments described herein can be used with any of the feed intended such as new feed or the feed and reprocessed manure mixture described herein.

The feed carriage includes a plurality of trays or hoppers arranged vertically on the carriage base. Usually, one hopper will be provided for each of the tiers of cages of the unit being serviced. Longitudinally extending open troughs are supported to extend laterally from each side of the hopper and arranged below so that feed placed in the hopper will naturally flow by gravity to the open troughs by interconnecting ducts or pipes.

In another embodiment, especially for the feeding of semi-dry feed mixtures, the trough is shaped in a curved cross-section configuration with an elongated cylindrical roller rotatably mounted in the trough and driven by a separate electrical motor or chain drive from a common power source. The rollers have longitudinal grooves or vanes along its outer surface to pick up the feed and slowly move it to an exposed position so that the poultry can feed. Unused feed is returned to the trough where it mixes with the new feed and returned again to the exposed position.

The feed carriage can also be arranged to include pressurized storage tanks at the level of each cage tier with a control system providing the flow of feed slurry to individual extruding nozzles arranged adjacent to each of the individual tiers of cages. A separate holding trough is positioned below the nozzles to receive the overflow of feed emitted and includes a control mechanism for reducing the flow of feed emitted when the rate of feeding becomes excessive.

Other objects of this invention will appear in the following description and appended claims, reference being made to the accompanying drawings forming a part of the specification wherein like reference characters designate corresponding parts in the several views.

FIG. 1 is a top plan view of an egg layer system according to the present invention which shows the plurality of rows of double cages with a carriage device positioned in one aisle between the rows and a trolley device shown at one end of the cage rows;

FIG. 2 is a cross section of the cage layer system according to this invention, taken along the lines 2—2 of FIG. 1;

FIG. 3 is a cross sectional view of another embodiment of the present invention showing a building enclosure having slanted sides and two units of cages arranged in double-deck fashion, aligned one over the other;

FIG. 4 is a top plan view showing one of the egg layer units of FIG. 3 including the continuous closed circuit path followed by the servicing carriages;

FIG. 5 is a top plan view showing another arrangement for the path for two servicing carriages wherein each half of the cage rows are serviced by one of the carriages before the carriages are replenished;

FIG. 6 is a partial side view of the cage arrangement shown in FIG. 3 and includes a manure collection carriage;

FIG. 7 shows a partial end view of the manure collection carriage with manure holding chase and scraping arms;

FIG. 8 is a partial top sectional view showing the manure scraping arms in the extended position from the manure chase;

FIG. 9 shows the scraping arms of FIG. 8 moving to the retracted position at the end of the cage row;

FIG. 10 is a partial side view of the carriage track which includes an actuation mechanism on the track for controlling the movement of the scraping arm mechanism;

FIG. 11 is a partial side view of the cage tiers with the egg collecting carriage shown in position;

FIG. 12 is a partial top view showing one egg collection tray with outwardly extending eegg retrieving arms;

FIG. 13 is a partial end view of the tray shown in FIG. 12, with the collection arms positioned adjacent to the floor of the cage tier;

FIG. 14 is a partial side view of the egg collection tray shown in FIG. 12 showing the relative position of the tray and retrieving arm with respect to the floor of the cages;

FIG. 15 is a partial perspective view of the front portion of the cages according to the present invention showing a plurality of the doors capable of being raised simultaneously;

FIG. 16 is a partial perspective view showing the cage doors of FIG. 15 with a single door being elevated;

FIG. 17 is a partial side sectional view through one of the cages showing the latch arrangement for the cage door;

FIG. 18 is a perspective view of the feed carriage according to the present invention showing the stacked feed troughs positioned to feed the poultry within the tiered cages;

FIG. 19 is a partial perspective view of one of the feed troughs modified to include a feed dispensing roller;

FIG. 20 is a partial cross-section of the feed trough and roller showing the feed grooves;

FIG. 21 is a partial cross-section showing another embodiment of feed roller having feed vanes;

FIG. 22 is an exploded perspective assembly view of the cage construction according to the present invention;

FIG. 23 is a partial sectional end view of the cage construction according to the present invention;

FIGS. 24a through 24d are pictorial presentations of the automatic loading mechanism utilized in transferring poultry from a holding cage to the production cages; and FIGS. 25a – 25d are pictorial side views showing the reverse process of FIG. 24 with the mechanism used to remove the poultry from the production cages to the holding cages.

Turning now more specifically to the drawings, FIGS. 1 and 2 show the overall view of the egg layer system according to this invention. In FIG. 1 is shown the enclosure building 10 having side walls 11 and 12 and end walls 13, 14. Within the building 10 are poultry cages 15 which are arranged in interior rows 16 and outer rows 17. The cage rows 16 are arranged parallel to the longitudinal axis of the building 10 and are of a double-cage type having a common rear wall. Along the inside surface of the side walls 11, 12 are arranged the single cage rows 17 supported on the side wall structure of the building. Aisles 18 having a consistently equal width are provided between the rows 16 and 17 of the cages 15. Transverse to the ends of the aisles 18 and along one end of the building 10 is a trolley device 19 having guide channels or rails 20, 21. A servicing carriage 22, as shown in the partially cutaway section of FIG. 1, is arranged to move along the entire length of the aisles 18. At the opposite end of the building 10 from the trolley device 19 is located water and feed conveyng devices 24 supplying feed and water to the troughs provided in the rows of cages. Adjacent to the feed hopper mechanism 24 is a walkway 25 arranged along the end wall 14. A bulk feed storage supply hopper 26 can be provided on the outside of the building to supply feed for the individual feed conveying devices.

The trolley device 19 is provided for shifting the carriage 22 into position or alignment with any of the aisles 18 for the purpose of servicing the cages facing the aisle. The carriage 22 is provided for performing the egg collecting functions from the individual cages and transporting the eggs to an egg conveying device 27 arranged along the end wall 13 of the building. Another function of a similar carriage 22 is to provide the scraping of the manure dropping boards provided below each of the cage tiers and the dumping of the manure into the pits below the aisles 18. An additional function is provided by a separate utility carriage 22 for the purpose of providing access to the individual cages by means of a height adjustable work platform which can be raised into position adjacent to any of the tiers of cages. This invention is also intended to include the provision of a single carriage which can combine all of the functions stated above into one unit which performs any of the functions desired at any time.

An access door 28 is provided in the side wall 12 of the building 10 for the extension of the trolley guide channels 20, 21 to other similar buildings and egg layer systems whereby the carriages 22 can be interchanged with other similar systems so that the carriages can be used in more than one system, if desired. It is to be understood that this feature also includes the possibility of both side walls of the building being opened by means of access doors 28 so that the carriage can be moved in either direction and possibly stored in a separate building until needed.

As shown in FIG. 2, suitable air ventilators 29 and circulation and ventilation fans 30 can be provided on the top and sides of the building, respectively, as desired. An air deflector 31 positioned directly under the roof ventilator can be provided to deflect the incoming or outgoing air and prevent drafts being directed onto the cages.

As shown in FIG. 2, an open manure collecting pit 32 can be provided for the collection of manure 32a scraped from the dropping boards of the poultry cages. This approach is commonly used in the poultry industry and it has been found that by positioning the fans 30 adjacent to the pit area, air can be drawn across the manure to maintain it in a dry state, where it can be stored for a considerable length of time, up to several years.

The plurality of cages provided in the present invention are supported in an elevated position by the structure 33. The structure 33 includes horizontal structural beams 34 which are supported transversely across the building by means of vertical columns 35. Longitudinal beams 36 are equi-spacedly positioned across the width of the building on the upper surface of the beams 34 and provide the support for the cage support columns 37. The top flange of the longitudinal cage support beams 36 is designed to have a width of approximately 10–15 inches which can be provided by extending the width of the top flange of the beam 36 or welding an additional continuous plate to the top of the beam to provide an outwardly extending shelf or guide rail support 23 for the servicing carriages 22. Along the inside surfaces of the side walls 11, 12 are mounted inverted wide-flanged structural angles 38 which are arranged at the same elevation as the upper flanges of the support beams 36 to provide the rails for movement of the carriage 22 along the outermost aisles. The cage support columns 37 are arranged longitudinally spaced on the center line of the support beams 36 to form the structure for the poultry cages 15. The upper ends of the cage columns 37 are tied together in a rigid framework by means of cross beams 39. If desired, upper guide rails 40 can be centrally suspended in each of the aisles 18 to the underside of the cross or lateral beams 39 and extend continuously in a longitudinal direction the length of the aisle 18. The upper guide rails 40 laterally stabilize the carriage 22 to allow the carriages 22 to be moved along the aisle so as to maintain an equal distance between the cages facing the aisle 18.

In the novel cage construction provided in the present invention, a continuous, one-piece, open wire mesh screen for each of the cage rows is attached along one side of the vertical columns 37 and arranged to extend the entire length of the cage rows 16 and 17. The interior cage rows 17 include cages arranged back to back with the cages extending outwardly on either side of the wire wall and the cage support columns 37. The cages in each row are arranged in multiple tiers. It is to be understood that the cages provided in the outer rows 17 include only half of the structure provided in the inner rows 16 so that a single cage is cantileveredly supported facing the interior of the building enclosure.

The roof of each cage tier is formed by a solid, continuous sheet material member which forms a dropping board 42 to shield or protect the lower cages from manure. The floor 43 of each tier of cages is formed from open mesh wire and tilted downwardly toward the aisle facing the cages. The tilt of the floor 43 is provided for allowing the eggs laid by the poultry to roll out of the cages to prevent cannibalism or damage to the eggs. Partitions 44 are provided to divide the cage rows into individual cages and doors 45 hingedly attached to the upper front edge of each cage are provided to complete the cage structure. The dropping boards 42, as can be seen in FIG. 2, are arranged parallel to the sloping floor 43 immediately above, thus providing an open space for insertion of a dropping board scraper.

One of the major problems that has been found in cage layer systems of the prior art is the accessibility and the servicing of the cages, especially in a multi-tier arrangement. In the present invention, servicing carriages 22 are provided and arranged to pass along the aisles 18 between the cages for performing the various functions necessary. Multiple carriage arrangements are provided in this invention to perform the necessary functions.

FIGS. 3 and 4 show another embodiment of the invention wherein a double-deck type egg laying system is provided. In this embodiment, an arrangement is provided for increasing the number of cages and includes provision for increased utilization of the enclosing structure. In addition, the enclosure structure includes side bracing with novel arrangements for increased air ventilation and flow.

The building enclosure 50 of this embodiment includes side walls 51, 52 and end walls 53, 54. A roof 55 extends upwardly from the side walls 51, 52 to a louvered ridge area 56.

Interior vertical cage support columns 57 mounted on foundation caissons 58 extend vertically the entire height of the building to support the roof surface 55. These columns 57 provide substantially the entire structural support for the roof and provide a dual purpose for the support of the individual cage rows. The side walls 51, 52 of the building 50 are arranged to slant outwardly so that the base of the walls is spaced from the outer rows of cage support columns 57. Cross bracing members 59 extending between the outer columns 57 and the walls 51, 52 support the walls and brace the building structure against side movement, such as caused by wind loading. If desired, a catwalk 60 can be provided in the upper level, as well as the lower level, (not shown) of the side wall structure to facilitate movement of personnel from one end of the building to the other.

The building 50 as shown in FIG. 3 which has a considerably greater height, lends itself nicely to improved natural ventilation arrangements. The longitudinally arranged louvered ridge area 56 can include a plurality of longitudinally spaced fans 61. In addition, side louvers 62 which can also include fans can be mounted along the entire length of the side walls 51, 52 to allow the inward flow of air into the building enclosure 50. A continuous baffle or membrane 63 extends inwardly from the side walls 51, 52 and extends completely across the lower portion of the building below the cage structure to be described later. For the present, however, it is sufficient to say that the cages arranged in longitudinal rows extend substantially the full length of the building and provide aisles between the cage rows. Openings 64 are provided in the baffle 63 in alignment with the cage aisles. Slidable doors or covers (not shown) can be positioned to cover various portions of the openings 64 as desired to control the actual amount of air flow passing upwardly through the aisles to balance the air flow throughout the entire building. The air thus passes through the lower air duct 65 from the louvers 62 and then passes up through the aisles of the building through the fans 61 and upper louvers 56. Water spray nozzles 66 can be provided in the air duct 65 to moisten the soil below the building so that the air pulled across the ground surface can be cooled, using the principle of evaporative cooling. As an alternative, it is possible to provide loosely packed fiber mats adjacent to the incoming louvers 62 and to moisten these mats to either provide the cooling or additional cooling, as desired. It is also possible to cover the ground surface with a continuous sheet of plastic or other membrane and to lay the fiber mats over the plastic sheet to absorb the water that is dispensed through the spray nozzle 66. It is also intended that space heaters (not shown) will be provided in the air duct 65 to heat the incoming air when necessary.

The overall interior building structure in the present embodiment shown in FIG. 3 is unique in that the plurality of cage support columns 57 mounted on the foundation caissons 58 extend completely to the ceiling portion of the building and support the roof surface 55. Lateral cross members 67 arranged near the base of the columns and adjacent to the baffle 63 laterally position the columns 57 with the upper cross members 68 provided near the roof surface 55. Depending upon the overall height of the building and the number of cage tiers desired, especially when the number of tiers is greater than seven or eight, intermediate cross members 69 can be positioned midway between the base and roof of the building to laterally support the columns 57. In this way, as shown in FIG. 3, two complete systems or units A and B can be provided which are essentially identical. Because these units are substantially the same, the following cage description will be directed to the lower unit A with the understanding that the structure in unit B is relatively the same.

The support columns 57 are arranged longitudinally and transversely in equally spaced arrangement along substantially the entire length of the building 50. The cages 70 are arranged in double, back to back arrangement along the inner rows 71 with a single cage arrangement provided on the outermost side rows 72. The space between the rows 71, 72 define aisles 73 which have consistently equal width. The aisles 73, thus, extend the length of the cage rows 71, 72 and define a passageway for the movement of servicing carriages 74 provided as part of this invention. The servicing carriages as provided in this embodiment are similar to those which have been previously described in my copending application and include parallel guide rails provided at the lower portion of each of the aisles 73 and mounted to the sides of the support columns 57. These rails can have an outwardly extending flange surface of approximately 4 or 6 inches and can include spacers along the sides of the column to equally space their position along the aisle for properly centering the carriage. At the upper end of each aisle 73 can be suspended a center guide rail 76 for stabilizing the lateral movement of the upper portion of the carriage 74. In addition, it is possible to provide electrical bus bars in the center rail 76 for providing electrical power for movement of the carriages or the center rail itself can be electrically insulated to provide this function.

At each end of the cage rows 71, 72 is provided the supporting floor surfaces 77, 78 for permitting the turnaround and shifting of the carriages 74. These areas are arranged to have sufficient space to permit the complete turnaround or reversal of the carriages 74 so that they can be directed from one aisle and returned into the next adjacent aisle for continuous operation. The turnaround areas 77, 78 provide a flat, smooth surface and are arranged at a level which is slightly below the level of the guide rails 75. The carriages 74 include at least four castertype swivel wheels suspended below the platform of the carriage to support the carriage when moved onto the floor turning area 77, 78. Thus, as the carriage 74 moves out of the aisle 73, the carriage base is moved from the flanged wheels riding on the guide rails 75 to the swivel type wheels 81 which extend below the level of the flanged wheels to support the carriage in the turnaround areas. By the use of the swivel type wheels, the carriage direction can be reversed in a minimum area to direct the carriage into the next adjacent row to continue the servicing process. A guide groove 79 is provided as a recessed slot in the surface of the turning area 77, 78 to direct the movement of the carriages in these areas. A follower 80 centrally mounted on the underportion of the carriage engages the guide groove 79 as it leaves the aisle so that the carriage follows the guide groove 79 to make its turn into the next aisle.

As can be easily seen in FIG. 4, the path followed by the servicing carriages 74 proceeds from a replenishing area 82 and follows a closed loop path along the guide groove 79 and down each aisle 73. Arrows are provided in FIG. 4 which show the direction and circuit followed by the carriages 74. Thus, as can be seen, the servicing carriages 74 follow the closed path to form a loop past each of the cages and return to the replenishing area 82 in each cycle. The carriages 74 are designed to move at a speed of approximately 4–6 feet per minute which is relatively slow so that a complete closed-loop circuit can be made in slightly less than 2 hours, depending upon the length of the cage rows and the number of aisles provided. The timing of the cycle can be of any duration, with a 2 hour cycle found to be satisfactory. It is obvious that the number of aisles must be of an even number so that the carriages can follow a completely closed loop path.

The replenishing area 82 includes a feed and water replenishing hopper 83, an egg collecting and conveying device 84 for moving the eggs to a processing area and a manure collection hopper 85 provided below the surface of the floor 78 for collecting the manure and transporting it to a processing area. The feed hopper 83 can be replenished from a large feed storage and mixing bin 86 positioned on the outside of the building. It is also to be understood that the manure collected by the carriage can be dropped at other locations within the building along the closed loop path, if desired.

In FIG. 5 is shown a similar arrangement in which the length of the cage rows 71, 72 and the aisles 73 have been greatly increased to expand the capacity of the overall system. A modified closed-loop path for the servicing carriage 74 is provided so that each of the cages can be serviced within the required two hour feeding cycle. As shown in FIG. 5, a service carriage replenishing area 82 is provided in each of the floor surface areas 77 and 78. Two complete sets of servicing carriages 74 are positioned in the continuous closed-loop carriage path, one at each of the floor areas. Thus, each of the servicing carriages passes by one-half of the total number of cages during the 2 hour period and arrives at the opposite replenishing area 82 wherein the feed and water are resupplied with the manure disposed and the eggs transferred. Because of the variations in the number of aisles possible and the length of the cage rows, the actual speed of the carriages can be adjusted as necessary to maintain the approximate 2 hour feeding cycle.

In addition to the servicing functions of the carriages 74, this arrangement lends itself to an added beneficial feature. Daylight type floodlights 87 can be mounted on the carriages to illuminate the cages directly adjacent to the carriages as the carriages pass by. With the remainder of the building maintained in relative darkness, an artificial day-night cycle can be created for the poultry which is believed to increase the overall egg production by accelerating the egg laying process to which the poultry is accustomed. Thus, the present carriage arrangement can be used not only to provide feed and water to the birds, but can also be used to expedite the production of eggs.

The actual cage construction in the present embodiment is identical to the construction shown and described in FIGS. 1 and 2. Thus, the cages 70 include the vertical one-piece wire wall 41, dropping boards 42 which form the roof of each tier of cages and wire mesh floor 43 arranged parallel to and spaced from the dropping boards below. Partitions 44 divide the cage tiers into individual cages 70 which are completed by hinge mounted doors arranged on the front of the individual cages so as to be pivoted outwardly and upwardly. One or more individual doors can be provided along the face of each cage. The bottom of the cage doors are spaced from the floor 43 of the cage to permit the eggs to roll outwardly into an egg collecting trough 46. The only difference in the cages disclosed in the embodiment of FIG. 3 is that the depth of the cage is considerably less than that shown for the previous cages. In this embodiment, the cage depth is intended to be approximately 10 inches from the rear wall 41 to the cage door 45. It is to be understood that the cage construction is identical throughout the entire system. Thus, the cages 70 of both the units A and B are identical.

A manure collecting carriage 88 which is provided in the lower unit A of the system includes a chase 89 extending upwardly from an opening in the base of the carriage to a point above the upper portion of the top tier of cages in the unit. A similar carriage 88a is provided when an upper deck or unit B is incorporated in the system. The carriage 88a incorporates a similar chase 89a which extends from the open portion of the carriage base to a point just below the dropping boards provided directly below the top tier of cages in this unit. Each of the chases 89 and 89a include outwardly flared side openings or chutes 92 corresponding to each tier of cages and running longitudinally along each side of the chase. The flared chutes 92 are positioned to extend under the edges of the dropping boards 42 provided for each tier. Pairs of scraping arms 93 are mounted outwardly from each side of the chase 89, 89a and are angled forwardly in the direction of movement of the carriages. These arms 93 are tilted upwardly away from the chase so as to be parallel with the dropping boards of the respective cage tiers. The ends 93a of the scraping arms 93 can be arranged to telescope within the body of the arms 93 and include springs so that they are biased outwardly. The arms 93, thus, extend the full depth of the dropping boards 42 with the ends 93a riding against the back flange of the board and around the columns 57 by means of sheet metal collars 94. In this way, the entire area of the dropping board 42 is scraped. It is to be understood that the portion of the arms 93 in contact with the board 42 can be of any suitable configuration such as a straight metal edge, rubber scraper or stiff bristle brush.

Immediately below each of the scraping arms 93 and flared chute 92 are located a pair of doors 95 which are hingedly mounted on the longitudinal sides of the chase 89, 89a. Thus, individual closeable compartments 96, one for each tier of cages, are provided in each of the chases 89 and 89a. In this way, the manure is held in the individual compartments 96 until the carriages 88, 88a arrive at the servicing area 82. It is not necessary for the carriages 88, 88a to travel the closed path through the cage rows aligned one over the other. However, it is necessary that when manure is to be dumped the bottom carriage 88 is to be aligned over the manure receiving pit 85 prior to the opening of the compartment doors 95. Also, it can be seen that the carriage 88a in turn must be aligned over the carriage 88 after the doors 95 of the carriage 88 have been opened. In this way, when the compartment doors 95 of the upper carriage 88a are opened, the chase 89 of the lower carriage forms a closed passageway for the dropping of the manure from the upper carriage into the pit 85.

It is also to be understood that the upper scraping arms 93 can be mounted towards the forward end of the chase 89, 89a with the lower arms staggered to the rear so that the lowermost arms 93 will be nearest to the rear of the chase. In this way, the scraping forces created by the contact of the arms with the dropping boards and which are transferred to the carriage structure will increase progressively and slowly as the carriage enters the aisle. This will help to prevent stalling of the carriage movement and allow the use of a smaller carriage drive motor.

A suitable mechanism is provided for extending and retracting the scraping arms 93. The mechanism is used to extend the scraping arms 93 as the carriage moves into a new row and retract the arms as they reach the end of the row. In this arrangement, the scraping arms 93 are pivoted around a fulcrum 97 provided along the sides of the chase 89, 89a. A central control arm 98 attached to links 99 connected to the scraping arms 93 is used to extend and retract the arms. Control bars 100a positioned along the side of the carriage guide rails 75 at the beginning and end of the row engages a lever 100 mounted along the forward outer wall of the chase 89, 89a. The lever 100 is suitably positioned to contact the first control bar 100a upon entering a new aisle so as to extend the scraping arms 93 automatically. In like token, the second control bar 100a is positioned at the end of the row to again contact the lever 100 in such a way as to retract the arms 93 at the end of the row. (see FIG. 9) The dropping boards 42 include an upwardly extending shoulder 101 at the ends of the row which are curved so that the end of the scraping arms 93a will follow the contour of the shoulder 101 to scrape any residue into the chase upon the carriages leaving the cage row.

A separate egg collecting carriage 102 can be provided in this system. Identical carriages can be used in separate units for the double-deck arrangements shown in FIG. 3. The carriages include an outer framework 103 which support individual egg collecting trays 104. A tray 104 is positioned in alignment with each tier of the poultry cage rows. The rear edge of the trays 104 is positioned adjacent to the edge of the floor 43 of the cages and four alignment rollers 105 are provided to align the floors on each side of the aisle with the trays to prevent any misadjustment in the height which would cause the eggs to drop an abnormal distance which could cause breakage. The trays 104 include a padded surface 104a of sponge type material to cushion the movement of the eggs and prevent damage. The tilt of the tray is towards the forward end of the carriage and the degree of tilt is sufficient to cause the eggs to roll slowly forward without breakage. The floors 43 of the cages 70 include an egg collecting trough or depression 46. An egg collecting arm 106 is pivotally mounted to extend outwardly from each side of the tray 104 and to ride along the egg collecting trough 46 of the cages. A downwardly curved outer end 107 of the arms 106 rides slightly above the surface of the egg collecting trough 46. The arms 106 are angled forwardly in the direction of movement of the carriage 102. A lip and opening 108 extends outwardly from the rear portion of the side of the tray 104 and fits under the edge of the floor 43. Because the carriage 102 is moving slowly along the aisle of the poultry cages, the eggs are gently guided and rolled upwardly over the flared portion of the trough 46 and onto the tray 104. Thus, because of this slow movement, the handling of the eggs is extremely gentle so as to greatly reduce the possibility of damage or breakage. A control raising mechanism 109 is connected to both of the arms 106 and is attached to the forward end of tray 104 so that, as the weight of the eggs increases to a point which simulates the capacity of the tray 104, the raising mechanism 109 is tripped so that the arms 106 are pivotally raised so that the curved portion 107 is out of contact with the remaining eggs in the storage trough 46. In this way, the carriage 102 completes the circuit of the rows without collecting any further eggs with the remaining eggs left for pickup in the next cycle of the carriage.

If desired, a bumping wheel can be attached to the side or underportion of each of the egg collecting trays so that, as the carriage moves along the aisle, a pulsating bump or vibration will be applied to the trays in order to move the eggs to the lowest point.

The collecting arms 106 are fabricated from a frangible or breakaway material so that if the arm encounters a solid object it will separate easily to prevent damage to the tray or cages. At the same time, the pivotal mounting of the arm is intended to allow the arm to move freely upward to allow it to ride over the leg or wing of a dead bird which might be lying in the egg trough outside of the cage.

A novel feed and water carriage 113 is provided in the present system (See FIGS. 18–21). As stated previously, no feed troughs or watering devices are provided in the cages of the present embodiment of the invention and the entire feeding and watering is provided by the carriage arrangement described herein. Food is provided solely by the feed carriage 113, while water cups or troughs for each tier of cages can be provided on the feed carriage 113 or any of the other carriages, such as the egg collecting carriage or the manure scraping carriage. If watering devices are provided on each of the carriages, the poultry will be afforded additional watering time over and above that provided by the passage of the individual feed carriage 113.

The feed carriage 113 includes the base platform 114 having a plurality of flanged wheels 115 which are rotatably mounted along the sides of the carriage to ride along the guide support rails 75. A feed support framework 116 which is centrally positioned on the carriage base 114 is arranged to extend upwardly to support a plurality of individual feed assemblies 117.

The feed assemblies 117 include a hopper 118, troughs 119 and enclosed ducts 120. The troughs 119 are connected to the outer ends of the ducts 120 which extend laterally outward and downward from each side of the hopper 118. The troughs 119, when providing dry feed to the poultry, are of the open type with the feed flowing by gravity from the hopper to the trough (See FIG. 18). The length of the troughs according to the present embodiment is approximately 8 feet. This length coupled with the slow movement of the carriage permits a feed exposure of about 2½ minutes to each of the birds during each cycle of the carriage. The trough 119 are positioned so that they move longitudinally adjacent to the doors 45 of the cages 70 so that they are easily within the reach of the caged birds. The elevation of the troughs can also be adjusted by raising or lowering the hoppers 118 to accommodate birds of different age and size. It is to be understood that, since the speed of the carriage is determined primarily by the size of the system being serviced, two or more feed carriages may be connected in tandem to maintain at least the two and a half minute feed exposure stated above.

Another embodiment of the feed trough 119a is shown in FIG. 20 which is primarily intended for the feeding of a semi-wet mash or feed mixture. In this arrangement, an elongated feed roller 121 is rotatably mounted in the trough 119a and is driven by a motor 122 for rotating the feed roller 120 slowly in the direction as shown by the arrows in FIG. 20. Longitudinal grooves or depressions 123 are provided around the circumference of the feed roller 121 with the bottom surface of the trough 119 curved to closely fit the outer diameter of the feed roller 121. An open feeding area 127 is provided in the upper portion of the trough 119a. In this way, feed 124 is picked up in each of the grooves 123 and moved into the exposed position in the opening 127 of the trough 119a to make it accessible to the poultry. The motor 122 includes a gear reduction device to control the rotating speed of the roller 121 to permit the birds to consume the exposed feed. In this arrangement, any feed which is not used is returned to the duct 120 by continuous rotation of the roller so that the unused feed will be re-mixed with new feed before being returned to the exposed feeding position. FIG. 26 shows another feed roller arrangement. The feed roller 121a includes slightly curved radial vanes 125 along the length of the roller 121a for carrying the feed 124 into the exposed open portion 127. This configuration allows a greater capacity of feed to be moved with each revolution of the roller with better mixing of the unused feed due to the curvature of the vanes.

Where it is contemplated that a more fluid or slurry type of feed mixture is to be used such as in the reusable manure arrangement to be described later, it is also possible that enclosed pressurized tanks can be substituted for the open hoppers 118. The tanks have a plurality of outwardly directed extruding nozzles arranged from each side and positioned adjacent to the cage doors. In this arrangement, the feed is poured into the individual pressurized tanks with the feed extruded as pellets or as a stream resembling spaghetti to provide the feed for the poultry. Separate elongated open troughs can be positioned below each of the nozzle rows to catch the unused feed. These troughs can be connected to a control mechanism whereby as the weight of the unused feed increases, the control mechanism will close off the nozzle valves to reduce the actual amount of feed extruded. In this way, the birds can feed directly from the nozzles or from the trough if an excess of feed is produced. The feeding of a relatively wet mash to the birds can greatly increase the water consumption of the birds reducing the necessity for additional watering devices.

A drive motor 126 is mounted on the carriage base platform 114 and is drivingly connected to one or more of the flanged wheels 119 for moving the carriage along the guide rails 75n a continuous, single direction as shown in FIG. 4. A separate drive wheel (not shown) can be suitably mounted under the base 114 for moving the carriage in the floor turnaround and replenishing areas. The upper end of the carriage framework 116 includes a centrally positioned guide bracket or rollers 127 which are arranged to contact the upper guide rail 76.

The drive motor 126 can be of any type suitable for propelling the feed carriage 113 such as an internal combustion engine or an electric motor. An electric motor is preferred since the problem of noise and exhaust fumes is eliminated which could have a detrimental effect on the poultry. The electrical power for the motor can be provided either by rechargeable batteries, charged during the replenishing operation, or electrified buss bars running parallel to the path of the carriage. Slidable contacts mounted on the carriage can be positioned for contacting the buss bars. The buss bars and slidable contacts can be positioned near the upper guide rail 76 to reduce the possibility of personnel accidentally coming in contact with the electrical circuit.

If a direct current source such as 28 VDC is utilized, one side of the circuit can be provided by electrically insulating the center guide rail 76 and the carriage guide bracket or rollers 127. A complete circuit for the motor can be obtained by grounding the carriage frame through the wheels 115 and carriage guide pin 80.

It is to be understood that the feed carriage 113 with its drive motor 126 can provide the entire motive force for all of the carriages including the egg and manure collecting carriages which can be connected in tandem with the feed carriage. In the alternative, each carriage can have its own separate drive motor. This may be especially desirable with respect to the manure collecting carriage which has a considerable drag due to the scraping action of the arms against the manure dropping boards. The utility carriage 110 can preferably be driven by rechargeable batteries since it is not intended to follow the closed-loop path of the other carriages and since it can remain parked for a longer period of time to fully charge the batteries.

The feed carriage feed to include a vertical duct or conduit 128 for supplying feed to each of the hoppers 118. The conduit 128 as shown in FIG. 18 is continuous from the uppermost hopper 118a to the bottom hopper 118b. The bottom of the conduit 128 is closed and elongated, longitudinal slots are provided in each side of the conduit corrsponding with each of the hoppers 118. The top of the conduit 128 is left open with the upper edge 129 spaced above the floor of the hopper 118a. As the feed is deposited into the upper hopper 118a, excess feed flows into the conduit 128 filling the remainder of the lower hoppers. Various other conduit configurations can be provided in the present invention. It is important that the feed be evenly distributed within the hoppers and that a sufficient amount of feed be provided to permit the carriage to make at least one closed loop cycle without exhausting the feed in any of the hoppers.

The actual cage construction of the present invention is similar to the arrangement shown in my previous co-pending patent application. As seen in FIG. 22 the cage support columns 57 are spaced longitudinally along each row of cages. A continuous open mesh wire sheet or wall 41 is stretched along and attached to one side of the columns 57 along the entire row. It is to be understood that a sheet 41 of solid material such as plastic or metal can be substituted for the open mesh wire configuration if it is desired to prevent cross-ventilation or separate portions of the system. Cage cross arms 47 are inserted through the wire mesh of the sheet 41 and are positioned horizontally and vertically spaced along each of the columns 57. It is required that a cross arm 47 be provided for each tier of cages within the row and the cross arms 47 for each respective tier are aligned horizontally. Hanger support bars 48 are connected between the ends of the corresponding cross arms 47. Dropping boards 42 with an upwardly turned central flange 42a are provided on each side of the wall 41 and are arranged to lay on top of the cross arms 47 to form a continuous dropping board area which is arranged to extend the full length of the cage row. It is intended that the dropping boards will overlap in the direction of the carriage movement so that the scraping arms will ride smoothly over the joints without interference. Cage partitions 44 are evenly spaced along the cage row and are attached between the wire wall 41 and the hanger support bars 48. They are attached along their bottom edge to the downwardly slanted cage floor 43 so as to support the floor which is attached along its back edge to the wire wall 41. Cage doors 45 are pivotally attached by rings or clips to the hanger support bar 48 and arranged to swing outwardly in order to provide access to the cages.

It should be noted that in the present cage construction there are no feed troughs or watering devices provided. Thus, the present cages used in combination with the servicing carriages are unique with respect to the prior art cages known in the industry. In addition the present cage construction is much more rigid in that the depth of the cages is approximately 10 inches. The birds can stand only one deep in the cage requiring each of the birds to align themselves adjacent to the cage doors. Without the extra weight of the feed troughs and due to the shortness of the cage overhang, the present structure is extremely rigid and sturdy which makes for a durable and economical cage system.

The cage door structure 45, provided herein, is arranged so that all of the doors in a group of three, four, or even five cages may be opened simultaneously. (See FIGS. 15 and 16). On the other hand, the individual door 45 in each cage 70 is divided into smaller sections 45b so that a single bird can be removed from a cage with the rest of the birds being held intact. The ability in the present design to simultaneously raise the doors in a group of cages lends itself to use with an automatic poultry loading and unloading mechanism which will be described hereinbelow.

An outwardly facing U-shaped spring clip 44a is attached to the front edge of each of the partitions 44. These clips are arranged in horizontal alignment and receive an elongated rod 49 which extends the length of a group of cages. In like fashion, each of the individual doors 45b have an inwardly facing U-shaped clip 45a which is aligned with the bar 49. Thus, the doors 45 are positioned on the outside of the bar 49 with the bar positioned between the doors 45 and the front edge of the partitions 44. In this way gripping the bar 49 and pulling outwardly releases the bar from the partition clips 44a allowing the entire group of doors to be raised. On the other hand, with the bar positioned in the partition clips 44a the individual doors 45b can be separately raised by releasing the respective clip 45a from the bar 49.

A utility carriage 110, which is shown in the bottom right hand portion of FIG. 4, is provided in the present invention. The utility carriage 110 can be parked in a separate storage area 111 which is a part of the building 50. The storage area 111 can include outer doors 112 so that the utility carriage 110 can be moved to other similar buildings or systems as desired. The utility carriage 110 not only has a set of flanged wheels for riding on the guide rails 75 as provided in the other carriages but includes a separate set of auxilliary wheels. The flanged and auxilliary wheels are driven by a self-contained power drive unit. The auxilliary wheels are of the steerable type so that the carriage can be moved independently along each of the floor areas 77 or 78 so as to move in and out of the aisles as desired.

The utility carriage 110 further includes an elevatable platform upon which an operator can stand so that any of the cages can be made accessible. In addition, the elevatable platform is designed to support a plurality of holding cages 113 which can be used to transport poultry and includes a mechanism for automatically transferring the poultry to and from the holding cages and the production cages. Thus a novel arrangement is provided for automatically transferring the birds without human contact.

The holding cages 113 mounted on the utility carriage platform are of the same width and size as the production cages 70. These cages are grouped to form a horizontal row having the same number of cages as the group defined by the cage door raising bars 49. As the operator moves the utility carriage 110 along the aisle between cages, he aligns the holding cages 113 with the corresponding production cages 70 to be filled. The floor 114 of the holding cage 113 is positioned slightly above the egg trough 46 of the production cage floor 43.

The holding cages 113 are constructed primarily from open wire mesh material arranged in sections to form the various elements of the cages. Various sections of the cages double to form the transfer mechanism. The holding cages each include a floor 114, roof 116 and rear wall 115. Fixed sidewalls or partitions (not shown) form the individual cages within the group and positionally correspond with the partitions of the production cages 70.

The floor 114 which is fixed includes a pivoted end section 114a which swings upward to form the door or front of the holding cage. By pivoting the section 114a downward a ramp is formed between the holding and production cages. The rear wall 115 of the holding cage is vertically mounted and is capable of being moved toward the production cage. The various movable sections are interconnected by a linkage mechanism to move the sections in the proper order and sequence.

In operation, after properly aligning the utility carriage and holding cages, the operator actuates the transfer mechanism. The mechanism can be operated manually or powered by an electric motor as desired. The production cage door group 45 is raised by extending a rigid arm which pulls the doors in an upwardly direction until they are horizontal. The holding cage front section 114a lowers and the rear wall 115 moves forward to transfer the poultry to the production cages. Once the poultry is in the production cage the doors 45 are again lowered and latched in the partition clips 44a. The holding cages 113 can again be restocked by merely lifting the pivotal ceiling section 116a.

To remove poultry from the production cages 70, the above described operation is essentially reversed, the major differences being that the rear wall 115 remains stationary and the ceiling sections 116 and 116a move forward into the cage 70 with the forward end 116a pivoting downward to urge the poultry into the holding cage 113. The upwardly pivoting floor section 114a retains the birds in the cage as the ceiling section 116 returns to its original position. It can be readily seen that a quick and automatic transfer operation is capable with the novel transfer mechanism provided in the present invention. An automatic transfer as described above is far less disturbing to the poultry than the manual capture and transfer methods presently in use.

This invention also provides a unique process for reusing the poultry manure collected by the manure carriage and deposited in the manure pit in the carriage replenishing area. The manure is transported from the pit to a separate processing area where it is subjected to a water percolation or leaching process whereby the undesirable or harmful ingredients in the manure can be removed so as to leave the palatable constituents in the form of a sludge. It is well known that the sludge or residue solid material of the poultry manure contains a substantial amount of unused carbohydrates and proteins present in the original feed which is not fully utilized in the poultry digestive system. In addition, certain vitamins generated by bacteria in the digestive tract have been found in the manure which can be of benefit to the poultry upon refeeding of the material.

It is intended that the reused manure sludge can be mixed with the feed in any proportion to obtain a desirable mixture. The residual water content of the sludge can be controlled, as desired, so that the manure-feed mixture can have any consistency required from a dry or wet mash to a semi-fluid slurry. Any of these feed types can be utilized in the appropriate feed trough arrangement described in the present system.

While an improved egg laying system has been shown and described in detail it is obvious that this invention is not to be considered to be limited to the exact form disclosed, and that changes in detail and construction may be made in the invention without departing from the spirit thereof.

What is claimed is:

1. A cage system for the production of poultry comprising:
   a. an elongated, enclosed building having a roof, side walls and end walls,
   b. a plurality of vertical support columns within said building to support the roof, said support columns being positioned equally spaced transversely and longitudinally within said building to form a plurality of longitudinal rows and aisles of equal width between said rows extending substantially the length of said building,
   c. a plurality of longitudinal rows of tiered cages suspended from said columns so as to face each of said aisles,
   d. a pair of parallel rails disposed longitudinally along the length of each of said aisles, the rails of each pair being arranged along the sides of said aisles and attached to said columns, the dimension between the rails of each pair being the same,
   e. carriage means arranged to ride along said rails whereby said carriage means can be moved along the full length of each aisle to service the cages facing the aisles,
   f. two open floor areas arranged at opposite ends of the building and adjacent to the ends of said aisles, said floor areas including guide means centrally located at the end of each aisle for receiving said carriage means and guiding the carriage means so as to direct it into another aisle whereby the carriage means will follow a continuous closed-loop path to service all of the rows of tiered cages,
   g. power drive means mounted on said carriage means and arranged for moving the carriage means continuously in a single direction along each of said aisles to follow said closed-loop path, and
   h. control means for controlling the movement of said carriage means whereby the cages can be serviced on a predetermined timed cycle so as to perform the necessary services such as feeding, egg collecting and cleaning of the cages.

2. A cage system as defined in claim 1 wherein:
   said support columns are interconnected near their midsection by a horizontal framework of structural members dividing the interior within the building into two or more separate sections, and
   the cages mounted on said columns are divided so as to provide a separate cage system in each section, said cage systems being arranged in a symmetrical stacked configuration with each system containing a separate carriage means and floor areas to provide the closed-loop servicing path.

3. A cage system as defined in claim 1 wherein:
   said poultry cages are free of any feed troughs or water devices so as to reduce the necessary structural strength of the cages, and the servicing carriage means provides the sole source of feed and water for the poultry as the carriage means are moved along the closed-loop path.

4. A cage system as defined in claim 1 wherein:

the building enclosures means is substantially sealed to exclude outside light, and said servicing carriage means includes lighting means for illuminating the area adjacent to the servicing carriage means so that a day-night situation is simulated for the poultry during each closed loop-cycle of the carriage means whereby egg production can be increased.

5. A cage system as defined in claim 1 wherein:

a continuous sheet material wall means is attached along one side of each of the longitudinal rows of columns, and said plurality of rows of poultry cages are suspended in cantilevered fashion from said wall means and columns.

6. A cage system as defined in claim 1 wherein:

an upper guide rail means is longitudinally disposed along the center of each of the cage aisles and is arranged to extend between the aisles to correspond with the closed-loop path followed by the carriage means whereby the upper portion of the carriage means is guided during its movement along the cage aisles and between the aisles, and said guide rail means is electrically insulated and connected to a source of electrical energy, said carriage means includes means connecting said electrical energy from said guide rails means to said power drive means for moving said carriage means along said closed-loop path.

7. A cage system as defined in claim wherein:

said carriage means includes a plurality of servicing carriages, each arranged to perform an individual function, and said plurality of carriages being connected in tandem with the lead carriage including said power drive means for moving said plurality of carriages around said closed-loop path.

8. A cage system as defined in claim 1 wherein:

the number of aisles formed by said cage rows in an even number whereby the carriage means passes along the aisles in the same direction each time while following said closed-loop path.

* * * * *

UNITED STATES PATENT OFFICE
CERTIFICATE OF CORRECTION

Patent No. 3,941,091          Dated    March 2, 1976

Inventor    ROGER L. FLESHMAN

It is certified that error appears in the above-identified patent and that said Letters Patent are hereby corrected as shown below:

Col. 3, Line 54, change "ocntinuous" to -- continuous --.

Col. 16, Line 36, change "75n" to -- 75 in --.

Col. 17, Line 11, change "feed to" to -- can --.

Col. 17, Line 12, change "feedto" to -- feed to --.

Col. 20, Line 66 (second line from bottom) change "water" to -- watering --.

Col. 22, Line 11, after "claim" add -- 1 --.

Col. 22, Line 19, change "in" to -- is --.

Signed and Sealed this fifteenth Day of June 1976

[SEAL]

Attest:

RUTH C. MASON
*Attesting Officer*

C. MARSHALL DANN
*Commissioner of Patents and Trademarks*